US009716283B2

(12) United States Patent
Furusawa et al.

(10) Patent No.: US 9,716,283 B2
(45) Date of Patent: Jul. 25, 2017

(54) METHOD OF STARTING FUEL CELL SYSTEM

(71) Applicant: HONDA MOTOR CO., LTD., Tokyo (JP)

(72) Inventors: Koichiro Furusawa, Tochigi (JP); Kaoru Yamazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 14/167,010

(22) Filed: Jan. 29, 2014

(65) Prior Publication Data

US 2014/0212780 A1 Jul. 31, 2014

(30) Foreign Application Priority Data

Jan. 29, 2013 (JP) .................. 2013-014398

(51) Int. Cl.
*H01M 8/04* (2016.01)
*H01M 8/04955* (2016.01)
(Continued)

(52) U.S. Cl.
CPC ... *H01M 8/04955* (2013.01); *H01M 8/04388* (2013.01); *H01M 8/04447* (2013.01);
(Continued)

(58) Field of Classification Search
CPC ......... H01M 4/04955; H01M 4/04447; H01M 4/04753; H01M 4/04388; H01M 4/04089; H01M 4/04223; H01M 2008/1095
See application file for complete search history.

(56) References Cited

U.S. PATENT DOCUMENTS

2004/0126628 A1* 7/2004 Balliet .............. H01M 8/04231
429/415
2010/0159341 A1 6/2010 Umayahara
(Continued)

FOREIGN PATENT DOCUMENTS

DE 10 2004 037 097 A1 3/2006
DE 10 2007 048 317 A1 4/2009
(Continued)

OTHER PUBLICATIONS

German Search Report application No. 10 2014 201 558.8 mailed Dec. 3, 2014.
(Continued)

*Primary Examiner* — Stephen Yanchuk
(74) *Attorney, Agent, or Firm* — Squire Patton Boggs (US) LLP

(57) ABSTRACT

Provided is a method of starting a fuel cell system including a hydrogen concentration acquisition process of acquiring a concentration of hydrogen in the anode, a threshold value determination process of determining whether or not the concentration of hydrogen which is acquired by the hydrogen concentration acquisition process is greater than or equal to a predetermined second threshold value, and a starting pressure setting process of setting a pressure of hydrogen supplied to an anode from a hydrogen tank when supplying hydrogen to the anode from the hydrogen tank in a state in which a contactor is shut off.

9 Claims, 5 Drawing Sheets

(51) Int. Cl.
  *H01M 8/0438* (2016.01)
  *H01M 8/0444* (2016.01)
  *H01M 8/04746* (2016.01)
  *H01M 8/04089* (2016.01)
  *H01M 8/04223* (2016.01)
  *H01M 8/1018* (2016.01)

(52) U.S. Cl.
  CPC .... *H01M 8/04753* (2013.01); *H01M 8/04089* (2013.01); *H01M 8/04223* (2013.01); *H01M 2008/1095* (2013.01)

(56) References Cited

U.S. PATENT DOCUMENTS

2010/0221624 A1* 9/2010 Makino ............. H01M 8/04097
  429/429
2012/0301804 A1* 11/2012 Wake ................. H01M 8/04
  429/429
2012/0308908 A1* 12/2012 Katano ............... H01M 8/04
  429/429

FOREIGN PATENT DOCUMENTS

| | | |
|---|---|---|
| DE | 11 2007 001 372 T5 | 4/2009 |
| DE | 11 2008 000 843 T5 | 2/2010 |
| JP | 2006-209996 A | 8/2006 |
| JP | 2007-027078 A | 2/2007 |
| JP | 2007-157449 A | 6/2007 |
| JP | 2007-165103 A | 6/2007 |
| JP | 2008-198406 A | 8/2008 |
| JP | 2009-301771 A | 12/2009 |
| JP | 2010-021115 A | 1/2010 |
| JP | 2011-014458 A | 1/2011 |
| JP | 2011-239639 A | 11/2011 |
| WO | 2006/012976 A1 | 2/2006 |
| WO | 2008/146122 A1 | 12/2008 |
| WO | 2009/049779 A1 | 4/2009 |

OTHER PUBLICATIONS

Japanese Office Action issued in corresponding JP Application No. 2013-014398, dated Aug. 9, 2016.

* cited by examiner

METHOD OF STARTING FUEL CELL SYSTEM

CROSS-REFERENCE TO RELATED APPLICATION

Priority is claimed on Japanese Patent Application No. 2013-014398, filed on Jan. 29, 2013, the disclosure of which is hereby incorporated herein by reference in its entirety.

BACKGROUND OF THE INVENTION

Field of the Present Invention

The present invention relates to a method of starting a fuel cell system.

Description of Related Art

In the related art, the following method is known. Specifically, when starting a fuel cell system, a fuel gas is supplied to an anode in a state (no-load state) in which an electric load is not connected to a fuel cell, and when carrying out substitution by the fuel gas, the pressure of the fuel gas is decreased in accordance with a concentration of the fuel gas to promote substitution by the fuel gas (for example, refer to Japanese Unexamined Patent Application, First Publication No. 2009-301771).

SUMMARY OF THE INVENTION

However, in the fuel cell system of the related art, as the pressure of the fuel gas decreases, time taken before the substitution of the fuel gas is completed on an inlet side and an outlet side of the anode increases, and thus there is a concern that the duration of excessive potential increase under no-load will also increase. In accordance with this, it is preferable to appropriately control promoting the substitution by the fuel gas and suppressing deterioration caused by the excessive potential increase over the entirety of the anode.

An aspect of the present invention is made in consideration of the above-described circumstances, and an object thereof is to provide a start-up method of a fuel cell system capable of shortening a start-up time by suppressing a deterioration that occurs during start-up of the fuel cell.

An aspect according to the present invention includes the following means for achieving the object related to solving the problems.

(1) According to an aspect of the present invention, a method of starting a fuel cell system is provided including a fuel cell that generates electricity by a fuel of an anode and an oxidant of a cathode, a fuel gas supply unit that supplies a fuel gas containing the fuel to the anode, an oxidant gas supply unit that supplies an oxidant gas containing the oxidant to the cathode, a connection and disconnection unit capable of completely switching connection and disconnection between the fuel cell and an electric load, and a control unit that controls the fuel gas supply unit and the oxidant gas supply unit. The method includes a hydrogen concentration acquisition process of acquiring a concentration of hydrogen as the fuel in the anode, a threshold value determination process of determining whether or not the concentration of the hydrogen which is acquired by the hydrogen concentration acquisition process is greater than or equal to a first threshold value, and a starting pressure setting process of setting a pressure of the hydrogen that is supplied from the fuel gas supply unit during execution of starting of the fuel cell for supplying the hydrogen to the anode from the fuel gas supply unit in a state in which the connection and disconnection unit is shut off based on a determination result determined by the threshold value determination process. In the starting pressure setting process, in a case where it is determined in the threshold value determination process that the concentration of the hydrogen is greater than or equal to the first threshold value, the hydrogen pressure is set to be less than or equal to a pressure of the hydrogen during execution of normal power generation that is executed after the starting of the fuel cell is completed, and in a case where it is determined in the threshold value determination process that the concentration of the hydrogen is less than the first threshold value, the pressure of the hydrogen is set to be higher than the pressure of the hydrogen during execution of the normal power generation.

(2) In the aspect of (1), the fuel cell system may further include a fuel gas discharge path from which the fuel gas discharged from the anode is allowed to flow, and a purge valve capable of opening and closing the fuel gas discharge path. The method may further include a predetermined pressure determination process of determining whether or not the pressure of the hydrogen supplied from the fuel gas supply unit during the starting of the fuel cell is greater than or equal to a predetermined pressure corresponding to the concentration of the hydrogen which is acquired by the hydrogen concentration acquisition process, and a purge valve opening and closing process of closing the purge valve in a case where it is determined in the predetermined pressure determination process that the pressure of the hydrogen is less than the predetermined pressure, and opening the purge valve in a case where it is determined in the predetermined pressure determination process that the pressure of the hydrogen is greater than or equal to the predetermined pressure.

(3) In the aspect of (2), in the threshold value determination process, it may be determined whether or not the concentration of the hydrogen which is acquired by the hydrogen concentration acquisition process is greater than or equal to a second threshold value larger than the first threshold value, and in a case where it is determined in the threshold value determination process that the concentration of the hydrogen is greater than or equal to the second threshold value, in the starting pressure setting process, the hydrogen pressure may be set to equal the pressure of the hydrogen during execution of the normal power generation. The method may further include a purge valve opening prohibiting process of prohibiting the opening of the purge valve in a case where it is determined in the threshold value determination process that the concentration of the hydrogen is greater than or equal to the second threshold value.

(4) In the aspect of any one of (1) to (3), the fuel cell system may further include a fuel gas supply path through which the fuel gas is allowed to flow to be supplied to the anode, a fuel gas discharge path through which the fuel gas discharged from the anode is allowed to flow, a fuel gas circulation path which connects the fuel gas discharge path and the fuel gas supply path and through which the fuel gas discharged from the anode is allowed to flow to the fuel gas supply path, and a hydrogen pump that circulates the hydrogen through the fuel gas circulation path. The method may further include a hydrogen pump drive process of driving the hydrogen pump during execution of starting of the fuel cell.

(5) In the aspect of (4), in a case where it is determined in the threshold value determination process that the concentration of the hydrogen is less than the first threshold value, in the hydrogen pump drive process, the number of drive revolutions of the hydrogen pump may be further increased compared to a case where it is determined in the threshold value determination process that the concentration of the hydrogen is greater than or equal to the first threshold value.

(6) In the aspect of (4) or (5), in the hydrogen pump drive process, the hydrogen pump may be driven prior to the supply of the hydrogen from the fuel gas supply unit to the anode.

(7) In the aspect of any one of (4) to (6), in the hydrogen pump drive process, a drive time of the hydrogen pump may be changed into an increasing trend along with an increase in a shut-down time of the fuel cell.

(8) In the aspect of (5), in the hydrogen pump drive process, the number of drive revolutions of the hydrogen pump may be decreased after a predetermined time elapses after increasing the number of drive revolutions of the hydrogen pump.

(9) In the aspect of any one of (1) to (8), in the hydrogen concentration acquisition process, the concentration of the hydrogen may be estimated using at least any one of the shut-down time of the fuel cell, an atmospheric pressure of the anode for a shut-down term of the fuel cell, and an atmospheric pressure of the cathode for the shut-down term of the fuel cell.

According to the aspect of (1), in a case where the concentration of hydrogen is greater than or equal to the first threshold value, it is assumed that substitution with hydrogen is completed in a short time over the entirety of the anode. According to this, the pressure of hydrogen supplied from the fuel gas supply unit is decreased compared to execution of normal power generation to promote substitution with hydrogen, and thus starting of the fuel cell can be quickly carried out.

On the other hand, in a case where the concentration of hydrogen is less than the first threshold value, it is assumed that the substitution with hydrogen over the entirety of the anode is not completed in a short time, and a time duration of an excessive potential increase under no-load becomes long. Accordingly, the pressure of hydrogen supplied from the fuel gas supply unit is increased compared to execution of normal power generation to promote mixing with hydrogen on an inlet side and an outlet side of the anode. As a result, the excessive potential increase under no-load can be suppressed, and thus deterioration of the fuel cell can be suppressed.

According to the aspect of (2), the purge valve is opened, and thus the substitution with hydrogen in the anode can be promoted.

According to the aspect of (3), the opening of the purge valve is prohibited, and thus it is possible to prevent the concentration of hydrogen discharged from the fuel gas discharge path from being excessive.

In addition, the hydrogen pressure during starting execution of the fuel cell is set to be equal to the hydrogen pressure during execution of the normal power generation, and thus execution of the normal power generation can be quickly initiated after completing the starting execution of the fuel cell.

According to the aspect of (4), the hydrogen pump in the fuel gas circulation path is driven, and thus the substitution with hydrogen in the anode can be promoted.

According to the aspect of (5), the number of drive revolutions of the hydrogen pump is increased, and thus mixing-in by hydrogen on an inlet side and an outlet side of the anode is promoted, and an excessive potential increase under no-load is quickly removed. As a result, deterioration of the fuel cell can be suppressed.

According to the aspect of (6), in a circulation system by the fuel gas circulation path, the fuel gas supply path, the anode, and the fuel gas discharge path, hydrogen is supplied from the fuel gas supply unit after forming a gas flow by driving the hydrogen pump, and thus the substitution with hydrogen in the anode can be promoted.

According to the aspect of (7), desired substitution with hydrogen in the anode can be carried out regardless of the shut-down time of the fuel cell.

According to the aspect of (8), the number of drive revolutions of the hydrogen pump is increased to promote the mixing-in by hydrogen on the inlet side and the outlet side of the anode, and then the number of drive revolutions of the hydrogen pump is decreased when discharging retained water inside a system of the anode. According to this, discharge of the retained water and water refilling in a catch tank are promoted, and thus the fuel cell system can be quickly started. In addition, power consumption is reduced, and thus operation efficiency of the fuel cell system can be improved.

According to the aspect of (9), the concentration of hydrogen can be accurately acquired without providing a sensor that detects the concentration of hydrogen, and the like.

DETAILED DESCRIPTION OF THE INVENTION

Hereinafter, a method of starting a fuel cell system according to an embodiment of the invention will be described with reference to the attached drawings.

For example, a fuel cell system 10 according to the embodiment is mounted on a vehicle 1 including a traveling drive motor M and a power drive unit PDU that controls the motor M as a power supply.

In addition, for example, the vehicle 1 includes a switch 2 such as an ignition switch that outputs a start signal instructing starting of the vehicle 1 or a stop signal instructing stopping of the vehicle 1 in response to an input operation by a driver.

Figure 1:
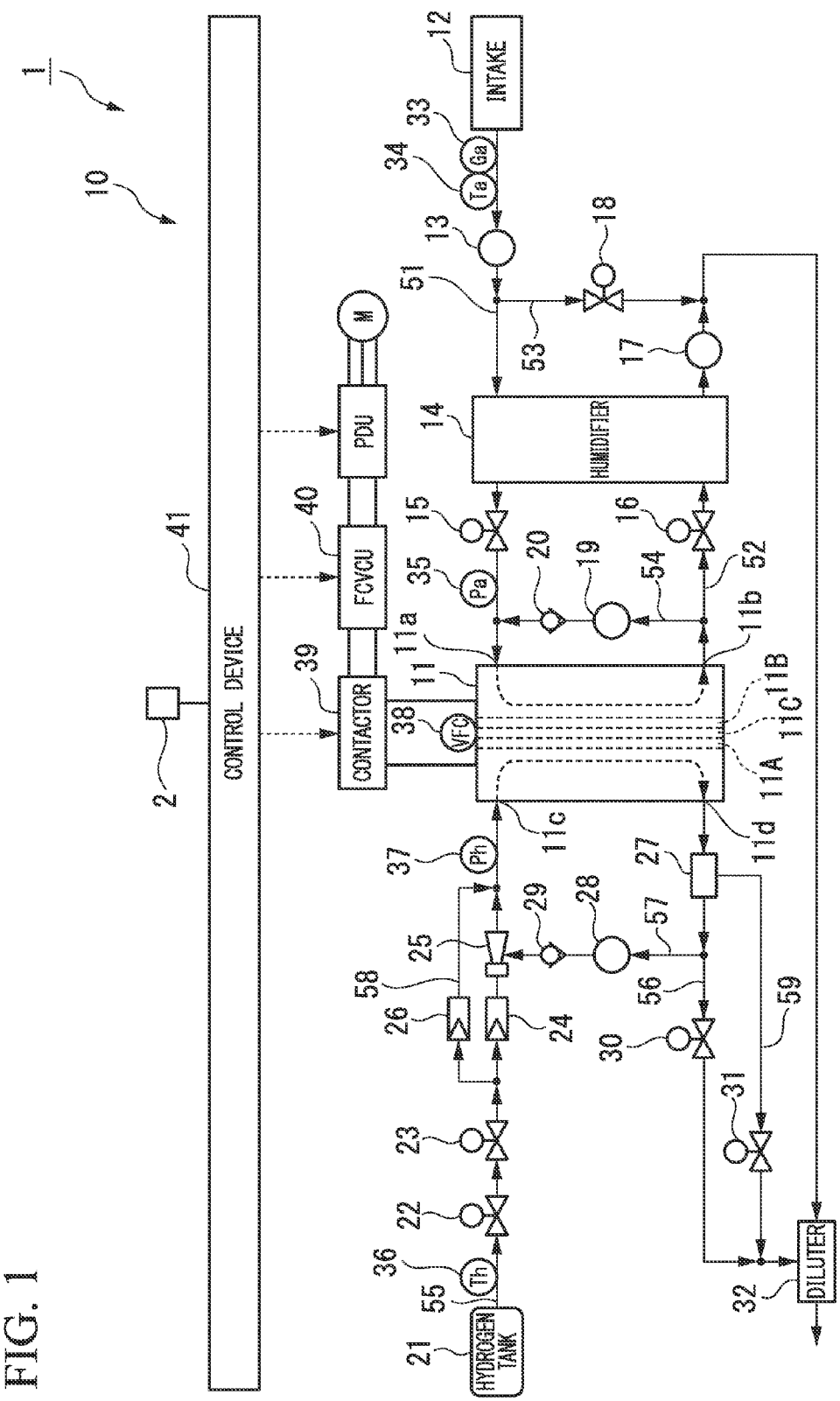
FIG. 1 is a configuration diagram of a fuel cell system according to an embodiment of the invention.

As shown in FIG. 1, the fuel cell system 10 includes a fuel cell stack 11 (a fuel cell), an intake 12, an air compressor 13 (oxidant gas supply unit), a humidifier 14, a sealing inlet valve 15, a sealing outlet valve 16, a pressure control valve 17, a bypass valve 18, an exhaust gas recirculation pump 19, a check valve 20, a hydrogen tank 21 (fuel gas supply unit), a hydrogen supply valve 22 (fuel gas supply unit), a shut-off valve 23, an injector 24, an ejector 25, a bypass injector 26, a gas-liquid separator 27, a hydrogen pump 28, a check valve 29, a purge valve 30, a drain valve 31, a diluter 32, an air flow sensor 33, a temperature sensor 34, a pressure sensor 35, a hydrogen-temperature sensor 36, a hydrogen pressure sensor 37, a voltage sensor 38, a contactor 39 (connection and disconnection unit), a voltage regulator (FCVCU) 40, and a control device 41 (control unit).

The fuel cell stack 11 includes a stacked body (not shown) in which a plurality of fuel cells are stacked, and a pair of end plates (not shown) that interposes the stacked body therebetween from both sides in a stack direction.

The fuel cell includes a membrane electrode assembly (MEA), and a pair of separators that interposes the membrane electrode assembly therebetween from both sides in a joint direction.

The membrane electrode assembly includes a fuel electrode (anode) 11A including an anode catalyst and a gas diffusion layer, an oxygen electrode (cathode) 11B including a cathode catalyst and a gas diffusion layer, and a solid polymer electrolyte membrane 11C which is interposed between the anode 11A and the cathode 11B from both sides in a thickness direction and which is formed from a cation-exchange membrane.

A fuel gas (reaction gas) containing hydrogen as a fuel is supplied to the anode 11A of the fuel cell stack 11 from the hydrogen tank 21, and air that is an oxidant gas (reaction gas) containing oxygen as an oxidant is supplied to the cathode 11B from the air compressor 13.

Hydrogen supplied to the anode 11A is ionized by a catalytic reaction on the anode catalyst, and hydrogen ions move to the cathode 11B through the solid polymer electrolyte membrane 11C that is appropriately humidified. Electrons that are generated along with the movement of the hydrogen ions may be taken out to an external circuit (voltage regulator 40 and the like) as a direct current.

The hydrogen ions moved from the anode 11A onto the cathode catalyst of the cathode 11B react with oxygen supplied to the cathode 11B and electrons on the cathode catalyst to generate water.

In addition, for example, a reference electrode (not shown) such as a dynamic hydrogen electrode (DHE) may be connected to the plurality of fuel cells of the fuel cell stack 11.

The reference electrode may measure a potential (anode potential) of an anode 11A with respect to a reference potential, for example, by setting hydrogen to a reference potential (0 V), and may output a signal of a measurement result to the control device 41.

For example, the reference electrode may be provided to all of a plurality of fuel cells, or may be provided to only a predetermined fuel cell among the plurality of fuel cells.

The air compressor 13 includes a motor that is drive-controlled by the control device 41, air is taken in from the outside through the intake 12 and is compressed by a drive force of the motor, and the compressed air is discharged to an oxidant gas supply path 51 connected to the cathode 11B.

The humidifier 14 includes, for example, a water permeable membrane such as a hollow fiber membrane, and humidifies air (cathode gas) discharged from the air compressor 13 to the oxidant gas supply path 51 by using a discharged gas (cathode off-gas) such as air discharged to an oxidant gas discharge path 52 from a cathode discharge port 11b of the fuel cell stack 11 as a gas for humidification.

More specifically, the humidifier 14 brings the air discharged from the air compressor 13 and a wet-state discharged gas discharged from the cathode discharge port 11b of the fuel cell stack 11 into contact with each other through a water permeable membrane to add moisture, which is permeated through a membrane hole of a water permeable membrane, in moisture (particularly, water vapor) contained in the discharged gas to air (cathode gas).

The sealing inlet valve 15 is provided to the oxidant gas supply path 51 that connects the air compressor 13 and a cathode supply port 11a capable of supplying air to the cathode 11B of the fuel cell stack 11. The sealing inlet valve 15 is capable of opening and closing the oxidant gas supply path 51 according to the control by the control device 41 and is capable of sealing the cathode 11B.

The sealing outlet valve 16 is provided to the oxidant gas discharge path 52 that connects the cathode discharge port 11b capable of discharging the discharged gas (cathode off-gas) such as air from the cathode 11B of the fuel cell stack 11 and the diluter 32. The sealing outlet valve 16 is capable of opening and closing the oxidant gas discharge path 52 according to the control by the control device 41 and is capable of sealing the cathode 11B.

The pressure control valve 17 is provided between the humidifier 14 and the diluter 32 in the oxidant gas discharge path 52, and controls a pressure of the cathode off-gas that flows through the oxidant gas discharge path 52 according to the control by the control device 41.

The bypass valve 18 is provided to a bypass path 53 that connects between the air compressor 13 and the humidifier 14 in the oxidant gas supply path 51 and between the pressure control valve 17 and the diluter 32 in the oxidant gas discharge path 52.

The bypass valve 18 is capable of supplying air supplied from the air compressor 13 to the diluter 32 through the bypass path 53 that is diverged from the oxidant gas supply path 51 and bypasses the cathode 11B, and is capable of opening and closing the bypass path 53 according to the control by the control device 41.

The exhaust gas recirculation pump 19 is provided to an exhaust gas recirculation path 54 that connects between the sealing inlet valve 15 and the cathode supply port 11a in the oxidant gas supply path 51, and between the cathode discharge port 11b and the sealing outlet valve 16 in the oxidant gas discharge path 52.

The exhaust gas recirculation pump 19 allows at least a part of the cathode off-gas, which passes through the cathode 11B of the fuel cell stack 11 and is discharged to the oxidant gas discharge path 52 from the cathode discharge port 11b, to flow through the exhaust gas recirculation path 54. In addition, the cathode off-gas, which has flown through the exhaust gas recirculation path 54, is mixed in air (cathode gas) that flows through the oxidant gas supply path 51 from the sealing inlet valve 15 toward the cathode supply port 11a, and is supplied again to the cathode 11B.

The check valve 20 is provided to the exhaust gas recirculation path 54 with a direction facing the oxidant gas supply path 51 from the oxidant gas discharge path 52 set as a forward direction.

The hydrogen tank 21 stores compressed hydrogen and is capable of discharging the hydrogen.

The hydrogen supply valve 22 is provided to a fuel gas supply path 55 that connects the hydrogen tank 21 and the anode supply port 11c capable of supplying hydrogen to the anode 11A of the fuel cell stack 11.

The hydrogen supply valve 22 supplies hydrogen, which has a pressure corresponding to the control by the control device 41, a signal pressure by the pressure of air discharged from the air compressor 13, or the like, to the fuel gas supply path 55 from the hydrogen tank 21.

The shut-off valve 23 is provided between the hydrogen supply valve 22 and the anode supply port 11c in the fuel gas supply path 55, and is capable of shutting off the fuel gas supply path 55 according to the control by the control device 41.

The injector 24 is provided between the shut-off valve 23 and the anode supply port 11c in the fuel gas supply path 55, and intermittently supplies hydrogen having a target pressure to the anode supply port 11c in a predetermined cycle according to the control by the control device 41. According to this, an interelectrode differential pressure between the cathode 11B and the anode 11A of the fuel cell stack 11 is maintained to a predetermined pressure.

The ejector 25 is provided between the injector 24 and the anode supply port 11c in the fuel gas supply path 55.

The ejector 25 allows at least a part of the discharged gas (anode off-gas) containing unreacted hydrogen, which passes through the anode 11A of the fuel cell stack 11 and is discharged from the anode discharge port 11d to the fuel gas discharge path 56, to flow through a fuel gas circulation path 57 that connects the fuel gas discharge path 56 and the fuel gas supply path 55. In addition, the anode off-gas that flows through the fuel gas circulation path 57 is mixed in hydrogen flowing through the fuel gas supply path 55 from the injector 24 toward the anode supply port 11c, and is supplied again to the anode 11A.

The bypass injector 26 is provided to a bypass path 58 that bypasses the injector 24 and the ejector 25 between the shut-off valve 23 and the anode supply port 11c in the fuel gas supply path 55 and is connected to the fuel gas supply path 55.

The bypass injector 26 supplies hydrogen having a target pressure to the anode supply port 11c to assist the injector 24 according to the control by the control device 41.

The gas-liquid separator 27 is provided between the anode discharge port 11d and the fuel gas circulation path 57 in the fuel gas discharge path 56.

The gas-liquid separator 27 separates moisture contained in the anode off-gas which passes through the anode 11A of the fuel cell stack 11 and is discharged from the anode discharge port 11d. In addition, the anode off-gas after being separated is discharged from a gas discharge port (not shown) that is connected to the fuel gas discharge path 56, and the moisture after being separated is discharged from a moisture discharge port (not shown) that is connected to the moisture discharge path 59.

The hydrogen pump 28 is provided to the fuel gas circulation path 57 that is connected to a position between the gas-liquid separator 27 and the purge valve 30 in the fuel gas discharge path 56 and a sub-stream introduction port (not shown) of the ejector 25.

The hydrogen pump 28 allows at least part of the anode off-gas, which passes through the anode 11A of the fuel cell stack 11 and is discharged to the fuel gas discharge path 56 from the anode discharge port 11d, to flow to the fuel gas circulation path 57. In addition, the anode off-gas that flows through the fuel gas circulation path 57 is mixed in hydrogen flowing through the fuel gas supply path 55 from the injector 24 toward the anode supply port 11c, and is supplied again to the anode 11A.

The check valve 29 is provided to the fuel gas circulation path 57 with a direction facing the fuel gas supply path 55 from the fuel gas discharge path 56 set as a forward direction.

The purge valve 30 is provided between a gas discharge port of the gas-liquid separator 27 and the diluter 32 in the fuel gas discharge path 56. The purge valve 30 is capable of opening and closing the fuel gas discharge path 56 according to the control by the control device 41, and is capable of supplying the anode off-gas discharged from the gas discharge port of the gas-liquid separator 27 to the diluter 32 according to the control by the control device 41.

The drain valve 31 is provided between a moisture discharge port of the gas-liquid separator 27 and the diluter 32 in a moisture discharge path 59. The drain valve 31 is capable of opening and closing the moisture discharge path 59 according to the control by the control device 41, and is capable of supplying moisture discharged from the moisture discharge port of the gas-liquid separator 27 to the diluter 32 according to the control by the control device 41.

The diluter 32 is connected to the oxidant gas discharge path 52, the fuel gas discharge path 56, and the moisture discharge path 59.

The diluter 32 dilutes a hydrogen concentration of the anode off-gas supplied from the purge valve 30 by air supplied from the bypass valve 18 or a cathode off-gas supplied from the pressure control valve 17. In addition, the diluter 32 discharges the discharged gas, in which the hydrogen concentration after being diluted is reduced to be less than or equal to a predetermined concentration, to the outside (for example, the air and the like).

The air flow sensor 33 is provided on a downstream side of the intake 12, detects a flow rate Ga of air taken from the outside through the intake 12, and outputs signals indicating detection results to the control device 41.

The temperature sensor 34 detects a temperature Ta of air supplied to the cathode 11B of the fuel cell stack 11, and outputs signals indicating detection results to the control device 41.

The pressure sensor 35 detects a pressure Pa of air supplied to the cathode 11B of the fuel cell stack 11, and outputs signals indicating detection results to the control device 41.

The hydrogen-temperature sensor 36 detects a temperature Th of the fuel gas supplied to the anode 11A of the fuel cell stack 11, and outputs signals indicating detection results to the control device 41.

The hydrogen pressure sensor 37 detects a pressure Ph of the fuel gas supplied to the anode 11A of the fuel cell stack 11, and outputs signals indicating detection results to the control device 41.

The voltage sensor 38 detects a voltage (that is, a total voltage that is the sum of voltages of a plurality of fuel cells) VFC between the positive electrode and the negative electrode of the fuel cell stack 11, and outputs signals indicating detection results to the control device 41.

The contactor 39 is connected to the positive electrode and the negative electrode of the fuel cell stack 11, and switches connection and disconnection between the fuel cell stack 11 and an electric load (for example, a power drive unit PDU and the like) according to the control by the control device 41.

The voltage regulator (FCVCU) 40 is disposed between the positive electrode and the negative electrode of the fuel cell stack 11 with the contactor 39 interposed therebetween, and an electric load, and regulates a voltage and a current that are output from the fuel cell stack 11 according to the control by the control device 41.

The control device 41 controls the operation of the fuel cell system 10 based on the signals output from the switch 2 and the signals which are output from the respective sensors 33 to 38 and indicates the detection results.

For example, in addition to an electric device such as the traveling drive motor M and an electric storage device (not shown) which are mounted on the vehicle 1, the fuel cell system 10 may include an electric load (for example, a discharge resistor, an electronic load, and the like) which is configured to be connected to and disconnected from the fuel cell stack 11 in a switching manner and in which a load current can be changed according to the control by the control device 41. In this case, the control device 41 is capable of controlling discharge to the electric load as discharge during power generation of the fuel cell stack 11.

The fuel cell system 10 according to the embodiment has the above-described configuration. Hereinafter, a control operation by the control device 41 during starting of the fuel cell system 10 (that is, a method of starting the fuel cell system 10) will be described.

Figure 2:
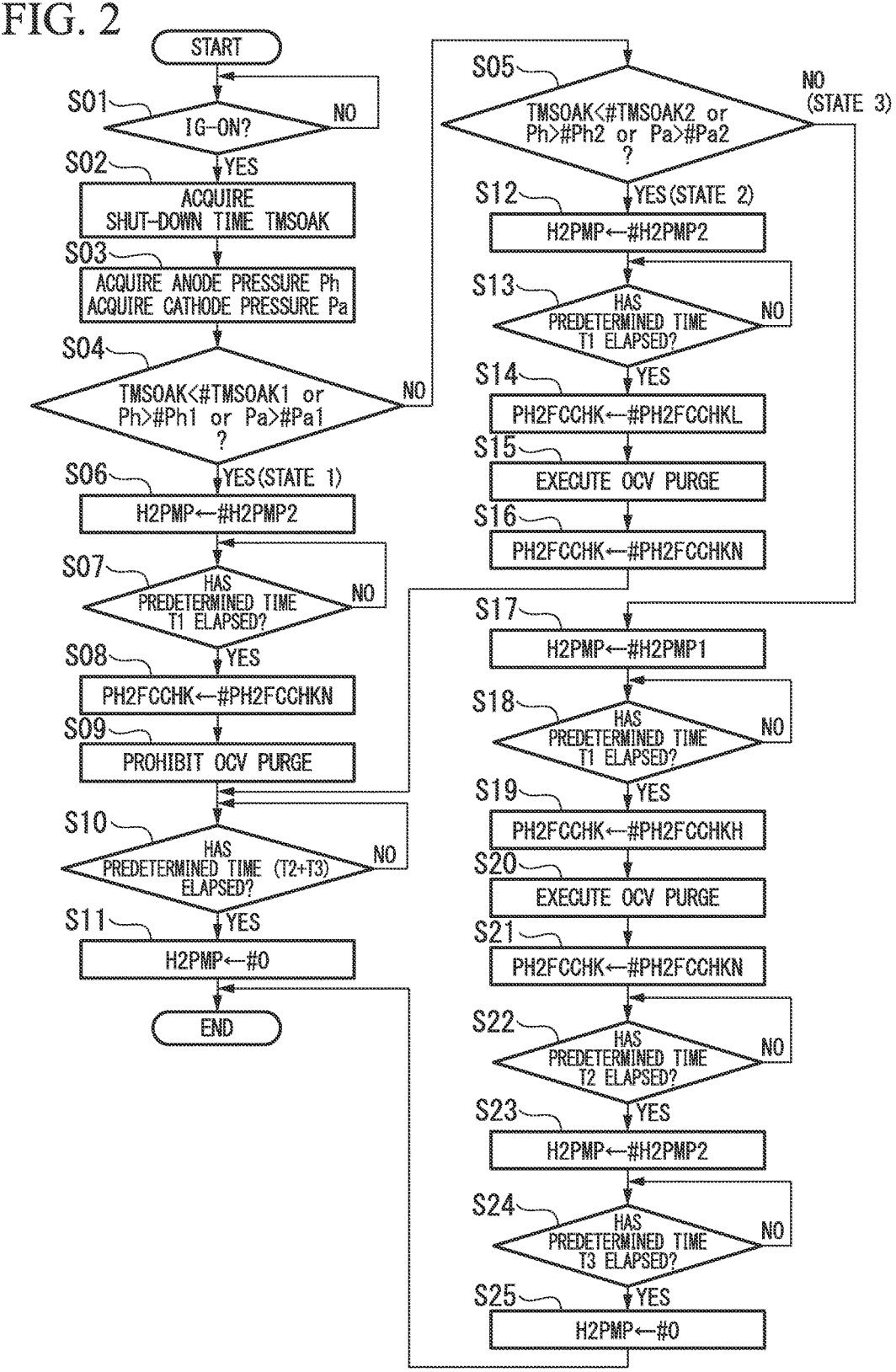
FIG. 2 is a flowchart illustrating an operation of a fuel cell system according to the embodiment of the invention, particularly, a control operation (that is, a method of starting the fuel cell system) by a control device during starting of the fuel cell system.

First, in Step S01 shown in FIG. 2, it is determined whether or not a start signal (IG-ON) instructing starting of the fuel cell system 10 by an input operation of a driver and the like with respect to the switch 2 is received.

In a case where the determination result is "NO", the determination process of Step S01 is repetitively executed.

On the other hand, in a case where the determination result is "YES", it proceeds to Step S02.

Next, in Step S02, as a hydrogen concentration acquisition process, a shut-down time (soak time) TMSOAK of the fuel cell stack 11 before the start signal is received is acquired.

Next, in Step S03, as a hydrogen concentration acquisition process, an atmospheric pressure of the anode 11A (anode pressure Ph) and an atmospheric pressure of the cathode 11B (cathode pressure Pa) during a shut-down term of the fuel cell stack 11 are acquired based on signals output from the pressure sensor 35 and the hydrogen pressure sensor 37.

In addition, the hydrogen concentration (anode hydrogen-concentration) in the anode 11A of the fuel cell stack 11 at a point in time at which the start signal of the fuel cell system 10 is received is set to a value corresponding to at least any of the shut-down time TMSOAK, the anode pressure Ph, and the cathode pressure Pa.

Figure 3:
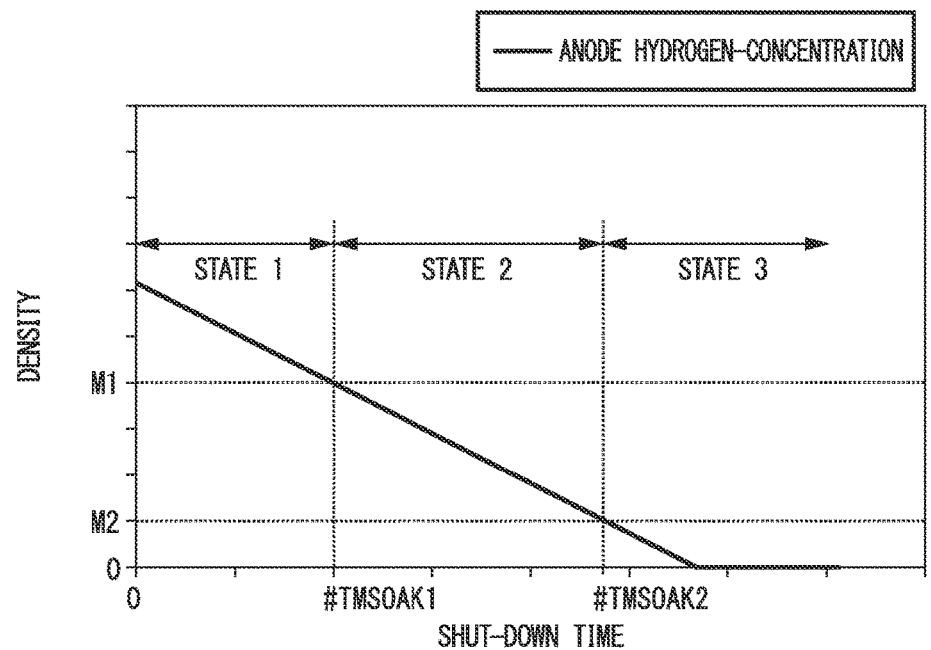
FIG. 3 is a diagram illustrating an example of a correlation between a concentration of hydrogen in an anode of a fuel cell stack (anode hydrogen-concentration) and a shut-down time at a point of time at which a start signal of the fuel cell system according to the embodiment of the invention is received.

For example, as shown in FIG. 3, as the shut-down time TMSOAK becomes longer, the anode hydrogen-concentration varies to a decreasing trend. When the shut-down time TMSOAK is less than or equal to a predetermined first shut-down time #TMSOAK1, the anode hydrogen-concentration is greater than or equal to a predetermined first threshold value M1. When the shut-down time TMSOAK is greater than or equal to a predetermined second shut-down time #TMSOAK2 that is longer than the predetermined first shut-down time #TMSOAK1, the anode hydrogen-concentration is less than or equal to a predetermined second threshold value M2 that is smaller than the predetermined first threshold value M1. When the shut-down time TMSOAK is greater than or equal to the predetermined first shut-down time #TMSOAK1 and is less than or equal to the predetermined second shut-down time #TMSOAK2, the anode hydrogen-concentration is less than or equal to the predetermined first threshold value M1 and is greater than or equal to the predetermined second threshold value M2.

Figure 4:
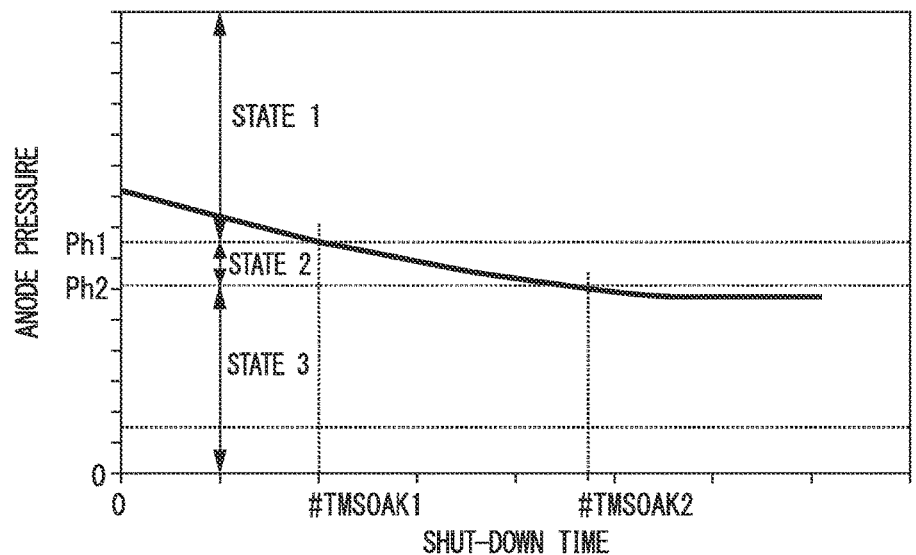
FIG. 4 is a diagram illustrating an example of a correlation between a hydrogen pressure (anode pressure) in the anode of the fuel cell stack and the shut-down time at a point of time at which the start signal of the fuel cell system according to the embodiment of the invention is received.

In addition, for example, as shown in FIG. 4, as the shut-down time TMSOAK becomes longer, the anode pressure Ph varies to a decreasing trend. When the shut-down time TMSOAK is less than or equal to the predetermined first shut-down time #TMSOAK1, the anode pressure Ph is greater than or equal to a predetermined first threshold value Ph1.

When the shut-down time TMSOAK is greater than or equal to the predetermined second shut-down time #TMSOAK2 that is longer than the predetermined first shut-down time #TMSOAK1, the anode pressure Ph is less than or equal to a predetermined second threshold value Ph2 that is smaller than the predetermined first threshold value Ph1. When the shut-down time TMSOAK is greater than or equal to the predetermined first shut-down time #TMSOAK1 and is less than or equal to the predetermined second shut-down time #TMSOAK2, the anode pressure Ph is less than or equal to the predetermined first threshold value Ph1 and is greater than or equal to the predetermined second threshold value Ph2.

In addition, as is the case with the anode pressure Ph, as the shut-down time TMSOAK becomes longer, the cathode pressure Pa varies to a decreasing trend. When the shut-down time TMSOAK is less than or equal to the predetermined first shut-down time #TMSOAK1, the cathode pressure Pa is greater than or equal to a predetermined first threshold value Pa1. When the shut-down time TMSOAK is greater than or equal to the predetermined second shut-down time #TMSOAK2 that is longer than the predetermined first shut-down time #TMSOAK1, the cathode pressure Pa is less than or equal to a predetermined second threshold value Pa2 that is smaller than the predetermined first threshold value Pa1. When the shut-down time TMS OAK is greater than or equal to the predetermined first shut-down time #TMSOAK1 and is less than or equal to the predetermined second shut-down time #TMSOAK2, the cathode pressure Pa is less than or equal to the predetermined first threshold value Pa1 and is greater than or equal to the predetermined second threshold value Pa2.

In addition, the predetermined first threshold value M1 with respect to the anode hydrogen-concentration is, for example, a hydrogen concentration which is capable of appropriately executing the normal power generation of the fuel cell stack 11 only by increasing a hydrogen pressure of the anode 11A to a predetermined pressure by driving the hydrogen pump 28 without needing to substitute the atmosphere of the anode 11A with hydrogen supplied from the hydrogen tank 21. In addition, for example, the normal power generation is power generation in which power generation efficiency of the fuel cell stack 11 is prioritized.

In addition, the predetermined second threshold value M2 with respect to the anode hydrogen-concentration is, for example, a hydrogen concentration with which the atmosphere of the anode 11A is classified into a state in which substitution with hydrogen supplied from the hydrogen tank 21 is prioritized, and a state in which suppression of occurrence of a high potential state in a cathode potential is prioritized. In addition, for example, the high potential state of the cathode potential occurs because a degree of substitution with hydrogen on an anode discharge port 11d side of the anode 11A is lower than that on an anode supply port 11c side.

For example, in the hydrogen concentration acquisition process, the anode hydrogen-concentration is assumed according to at least any of the shut-down time TMSOAK, the anode pressure Ph, and the cathode pressure Pa based on data such as a predetermined map shown in FIGS. 3 and 4 which is set in advance.

Next, in Step S04, as a threshold value determination process, it is determined whether or not the anode hydrogen-concentration is larger than the predetermined first threshold value M1.

More specifically, it is determined whether or not the shut-down time TMSOAK is less than the predetermined first shut-down time #TMSOAK1, whether or not the anode pressure Ph is larger than the predetermined first threshold value Ph1, or whether or not the cathode pressure Pa is larger than the predetermined first threshold value Pa1.

In a case where the determination result is "YES", it is determined as "State 1", and it proceeds to Step S06, which will be described later.

On the other hand, in a case where the determination result is "NO", it proceeds to Step S05.

Next, in Step S05, as a threshold value determination process, it is determined whether or not the anode hydrogen-concentration is larger than the predetermined first threshold value M2.

More specifically, it is determined whether or not the shut-down time TMSOAK is less than the predetermined second shut-down time #TMSOAK2, whether or not the anode pressure Ph is larger than the predetermined second threshold value Ph2, or whether or not the cathode pressure Pa is larger than the predetermined second threshold value Pa2.

In a case where the determination result is "YES", it is determined as "State 2", and it proceeds to Step S12, which will be described later.

On the other hand, in a case where the determination result is "NO", it is determined as "State 3" and it proceeds to Step S17, which will be described later.

In addition, in Step S06, prior to the supply of hydrogen from the hydrogen tank 21 to the anode 11A, a hydrogen pump drive process of driving the hydrogen pump 28 is executed. In the hydrogen pump drive process, a value corresponding to a determination result in the threshold value determination process, for example, a second predetermined number of drive revolutions #H2PMP2 that is smaller than a first predetermined number of drive revolutions #H2PMP1 is set for a command value H2PMP that indicates the number of drive revolutions of the hydrogen pump 28.

In addition, in Step S07, it is determined whether or not a predetermined time T1 (time necessary for the number of drive revolutions of the hydrogen pump 28 to reach the command value H2PMP: a drive time) has elapsed.

In a case where the determination result is "NO", the determination process of Step S07 is repetitively executed.

On the other hand, in a case where the determination result is "YES", it proceeds to Step S08. According to this, for example, as shown in FIG. 5, in a period of a drive time T1 after the time t1 at which the start signal (IG-ON) is received, the number of drive revolutions of the hydrogen pump 28 reaches the command value H2PMP (=the second number of drive revolutions #H2PMP2).

In addition, in Step S08, as a starting pressure setting process, a value corresponding to a determination result in the threshold value determination process is set for a pressure command value PH2FCCHK that indicates a hydrogen pressure of the anode 11A during the supply of hydrogen from the hydrogen tank 21 to the anode 11A in a state in which the contactor 39 is shut off. Then, the supply of hydrogen from the hydrogen tank 21 to the anode 11A is initiated. In the starting pressure setting process, for example, a predetermined pressure #PH2FCCHKN such as a hydrogen pressure during execution of the normal power generation that is executed after the starting of the fuel cell system 10 is completed is set for the pressure command value PH2FCCHK.

In addition, in Step S09, as a purge valve opening prohibiting process, execution of OCV purge is prohibited. The OCV purge is an operation of supplying hydrogen from the hydrogen tank 21 to the diluter 32 through the anode 11A in a no-load state (that is, non-power-generation state) in which the fuel cell stack 11 is shut off from the electric load, and in an opened valve state of the purge valve 30 and the shut-off valve 23.

Figure 5:
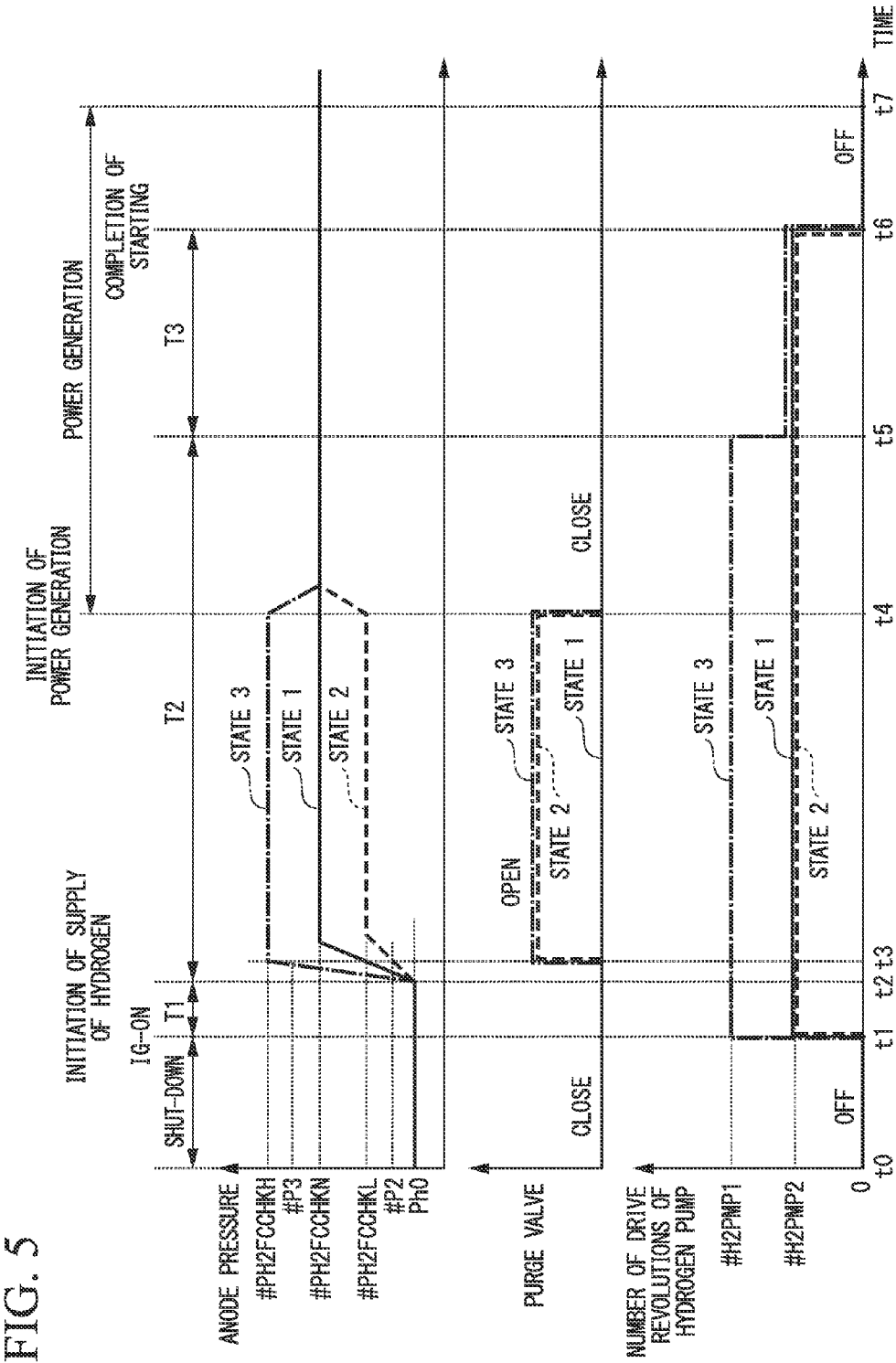
FIG. 5 is a diagram illustrating an example of time variations of hydrogen pressure in the anode of the fuel cell stack in respective states 1, 2, and 3, opened and closed states of a purge valve, and the number of drive revolutions of a hydrogen pump during starting of the fuel cell system according to the embodiment of the invention.

According to this, for example, as shown in FIG. 5, after a time t2 at which the supply of hydrogen from the hydrogen tank 21 to the anode 11A is initiated, the hydrogen pressure of the anode 11A increases from a predetermined initial value Ph0 toward the pressure command value PH2FCCHK (=predetermined pressure #PH2FCCHKN). In addition, the purge valve 30 is maintained in a closed valve state.

In addition, the power generation of the fuel cell stack 11 is initiated at a predetermined time t4 (for example, a point in time at which the voltage of the fuel cell stack 11 reaches a predetermined voltage permitting initiation of power generation) after the hydrogen pressure of the anode 11A reaches the pressure command value PH2FCCHK (=predetermined pressure #PH2FCCHKN).

In addition, in Step S10, it is determined whether or not a predetermined time (T2+T3) has elapsed after initiating the supply of hydrogen from the hydrogen tank 21 to the anode 11A.

In a case where the determination result is "NO", the determination process of Step S10 is repetitively executed.

On the other hand, in a case where the determination result is "YES", it proceeds to Step S11.

In addition, the predetermined time T2 is a drive time duration of the hydrogen pump 28 which is necessary to substitute the atmosphere of the anode 11A with hydrogen supplied from the hydrogen tank 21 to a predetermined degree. The predetermined time T3 is a drive time duration of the hydrogen pump 28 which is necessary to discharge retained water inside the system of the anode 11A by hydrogen supplied from the hydrogen tank 21 to a predetermined degree. The predetermined time T3 in "State 1" and "State 2" may be set to be shorter than the predetermined time T3 of "State 3", which will be described later, or may be set to zero.

In addition, in Step S11, the command value H2PMP that indicates the number of drive revolutions of the hydrogen pump 28 is set to zero, the starting of the fuel cell system 10 is completed, and it proceeds to an end. According to this, for example, as shown in FIG. 5, after a time t6 at which the command value H2PMP is set to zero, the number of drive revolutions of the hydrogen pump 28 decreases toward zero.

In addition, in Step S12, prior to the supply of hydrogen from the hydrogen tank 21 to the anode 11A, a hydrogen pump drive process of driving the hydrogen pump 28 is executed. In the hydrogen pump drive process, a value corresponding to a determination result in the threshold value determination process, for example, a second predetermined number of drive revolutions #H2PMP2 that is smaller than a first predetermined number of drive revolutions #H2PMP1 is set for the command value H2PMP that indicates the number of drive revolutions of the hydrogen pump 28.

In addition, in Step S13, it is determined whether or not a predetermined time T1 (time necessary for the number of drive revolutions of the hydrogen pump 28 to reach the command value H2PMP: a drive time) has elapsed.

In a case where the determination result is "NO", the determination process of Step S13 is repetitively executed.

On the other hand, in a case where the determination result is "YES", it proceeds to Step S14. According to this, for example, as shown in FIG. 5, in a period of the drive time T1 after a time t1 at which the start signal (IG-ON) is received, the number of drive revolutions of the hydrogen pump 28 reaches the command value H2PMP (=the second number of drive revolutions #H2PMP2).

In addition, in Step S14, as a starting pressure setting process, a value corresponding to a determination result in the threshold value determination process is set for the pressure command value PH2FCCHK that indicates the hydrogen pressure of the anode 11A during the supply of hydrogen from the hydrogen tank 21 to the anode 11A in a state in which the contactor 39 is shut off. Then, the supply of hydrogen from the hydrogen tank 21 to the anode 11A is initiated. In the starting pressure setting process, for example, a low-side predetermined pressure #PH2FCCHKL smaller than the predetermined pressure #PH2FCCHKN such as the hydrogen pressure during execution of the normal power generation that is executed after the starting of the fuel cell system 10 is completed is set for the pressure command value PH2FCCHK. In addition, for example, the normal power generation is power generation in which power generation efficiency of the fuel cell stack 11 is prioritized.

In addition, in Step S15, a predetermined pressure determination process and a purge valve opening process are executed. In the predetermined pressure determination process, it is determined whether or not the hydrogen pressure of the anode 11A reaches a value greater than or equal to a predetermined threshold value #P2 that corresponds to the determination result in the predetermined threshold value determination process. In a case where it is determined in the predetermined pressure determination process that the hydrogen pressure of the anode 11A reaches the value greater than or equal to the predetermined threshold value #P2 that corresponds to the determination result in the threshold value determination process, OCV purge is executed in the purge valve opening process. On the other hand, in a case where it is determined in the predetermined pressure determination process that the hydrogen pressure of the anode 11A is less than the predetermined threshold value #P2, the purge valve 30 is maintained to the closed valve state.

According to this, for example, as shown in FIG. 5, after the time t2 at which the supply of hydrogen from the hydrogen tank 21 to the anode 11A is initiated, the hydrogen pressure of the anode 11A increases from the predetermined initial value Ph0 toward the pressure command value PH2FCCHK (=low-side predetermined pressure #PH2FCCHKL). In addition, at a time t3 at which the hydrogen pressure of the anode 11A reaches the predetermined threshold value #P2, the purge valve 30 is switched from the closed valve state to the opened valve state.

In addition, in Step S16, for example, as shown in FIG. 5, at the predetermined time t4 after the hydrogen pressure of the anode 11A reaches the pressure command value PH2FCCHK (=low-side predetermined pressure #PH2FCCHKL), the predetermined pressure #PH2FCCHKN is set for the pressure command value PH2FCCHK. In addition, the purge valve 30 is switched from the opened valve state to the closed valve state, and the power generation of the fuel cell stack 11 is initiated.

In addition, the predetermined time t4 is, for example, a point in time at which a voltage of the fuel cell stack 11 reaches a predetermined voltage permitting initiation of power generation, a point in time at which an amount of hydrogen (a purge amount) discharged from the purge valve 30 to the diluter 32 reaches a predetermined amount, and the like. Whether or not the amount of hydrogen (purge amount) reaches the predetermined amount may be determined based on a differential pressure between the atmospheric pressure outside the fuel cell stack 11 and the pressure of the anode 11A, the size of the purge valve 30, and the like, or may be determined according to whether or not the an execution time duration of the OCV purge reaches a predetermined time. In addition, after execution of the Step S16, it proceeds to the above-described Step S10.

In addition, in Step S17, prior to the supply of hydrogen from the hydrogen tank 21 to the anode 11A, the hydrogen pump drive process of driving the hydrogen pump 28 is executed. In the hydrogen pump drive process, a value corresponding to a determination result in the threshold value determination process, for example, the first predetermined number of drive revolutions #H2PMP1 that is larger than the second predetermined number of drive revolutions #H2PMP2 is set for the command value H2PMP that indicates the number of drive revolutions of the hydrogen pump 28.

In addition, in Step S18, it is determined whether or not the predetermined time T1 (time necessary for the number of drive revolutions of the hydrogen pump 28 to reach the command value H2PMP: a drive time) has elapsed.

In a case where the determination result is "NO", the determination process of Step S18 is repetitively executed.

On the other hand, in a case where the determination result is "YES", it proceeds to Step S19. According to this, for example, as shown in FIG. 5, in the period of the drive time T1 after the time t1 at which the start signal (IG-ON) is received, the number of drive revolutions of the hydrogen pump 28 reaches the command value H2PMP (=the first number of drive revolutions #H2PMP1).

In addition, in Step S19, as the starting pressure setting process, a value corresponding to a determination result in the threshold value determination process is set for the pressure command value PH2FCCHK that indicates the hydrogen pressure of the anode 11A during the supply of hydrogen from the hydrogen tank 21 to the anode 11A in a state in which the contactor 39 is shut off. Then, the supply of hydrogen from the hydrogen tank 21 to the anode 11A is initiated. In the starting pressure setting process, for example, the high-side predetermined pressure #PH2FCCHKH larger than the predetermined pressure #PH2FCCHKN such as the hydrogen pressure during execution of the normal power generation that is executed after the starting of the fuel cell system 10 is completed is set for the pressure command value PH2FCCHK. In addition, for example, the normal power generation is power generation in which power generation efficiency of the fuel cell stack 11 is prioritized.

In addition, in Step S20, the predetermined pressure determination process and the purge valve opening process are executed. In the predetermined pressure determination process, it is determined whether or not the hydrogen pressure of the anode 11A reaches a value greater than or equal to a predetermined threshold value #P3 that corresponds to the determination result in the threshold value determination process. In a case where it is determined in the predetermined pressure determination process that the hydrogen pressure of the anode 11A reaches a value greater than or equal to the predetermined threshold value #P3 that corresponds to the determination result in the threshold value determination process, OCV purge is executed in the purge valve opening process. On the other hand, in a case where it is determined in the predetermined pressure determination process that the hydrogen pressure of the anode 11A is less than the predetermined threshold value #P2, the purge valve 30 is maintained to the closed valve state.

According to this, for example, as shown in FIG. 5, after the time t2 at which the supply of hydrogen from the hydrogen tank 21 to the anode 11A is initiated, the hydrogen pressure of the anode 11A increases from the predetermined initial value Ph0 toward the pressure command value PH2FCCHK (=high-side predetermined pressure #PH2FCCHKH). In addition, at the time t3 at which the hydrogen pressure of the anode 11A reaches the predetermined threshold value #P3, the purge valve 30 is switched from the closed valve state to the opened valve state.

In addition, in Step S21, for example, as shown in FIG. 5, at the predetermined time t4 after the hydrogen pressure of the anode 11A reaches the pressure command value PH2FCCHK (=high-side predetermined pressure #PH2FCCHKH), the predetermined pressure #PH2FCCHKN is set for the pressure command value PH2FCCHK. In addition, the purge valve 30 is switched from the opened valve state to the closed valve state, and the power generation of the fuel cell stack 11 is initiated.

In addition, the predetermined time t4 is, for example, a point of time at which a voltage of the fuel cell stack 11 reaches a predetermined voltage permitting initiation of power generation, a point of time at which an amount of hydrogen (purge amount) discharged from the purge valve 30 to the diluter 32 reaches a predetermined amount, and the like. Whether or not the amount of hydrogen (purge amount) reaches the predetermined amount may be determined based on a differential pressure between the atmospheric pressure outside the fuel cell stack 11 and the pressure of the anode 11A, the size of the purge valve 30, and the like, or may be determined according to whether or not the an execution time duration of the OCV purge reaches a predetermined time.

In addition, in Step S22, it is determined whether or not the predetermined time T2 has elapsed after the supply of hydrogen from the hydrogen tank 21 to the anode 11A is initiated.

In a case where the determination result is "NO", the determination process of Step S22 is repetitively executed.

On the other hand, in a case where the determination result is "YES", it proceeds to Step S23.

In addition, the predetermined time T2 is a drive time duration of the hydrogen pump 28 which is necessary to substitute the atmosphere of the anode 11A with hydrogen supplied from the hydrogen tank 21 to a predetermined degree.

In addition, in Step S23, the second predetermined number of drive revolutions #H2PMP2 that is smaller than the first predetermined number of drive revolutions #H2PMP1 is set for the command value H2PMP that indicates the number of drive revolutions of the hydrogen pump 28.

According to this, for example, as shown in FIG. 5, after a time t5 after elapse of the predetermined time T2 after the supply of hydrogen from the hydrogen tank 21 to the anode 11A is initiated, the number of drive revolutions of the hydrogen pump 28 decreases from the first predetermined number of drive revolutions #H2PMP1 toward the second predetermined number of drive revolutions #H2PMP2.

In addition, in Step S24, it is determined whether or not the predetermined time T3 has elapsed after the supply of hydrogen from the hydrogen tank 21 to the anode 11A is initiated.

In a case where the determination result is "NO", the determination process of Step S24 is repetitively executed.

On the other hand, in a case where the determination result is "YES", it proceeds to Step S25.

In addition, the predetermined time T3 is a drive time duration of the hydrogen pump 28 which is necessary to discharge retained water of the anode 11A by hydrogen supplied from the hydrogen tank 21 to a predetermined degree. The predetermined time T3 in "State 3" is set to be longer than the predetermined time T3 in "State 1" and "State 2".

In addition, in Step S25, the command value H2PMP that indicates the number of drive revolutions of the hydrogen pump 28 is set to zero, the starting of the fuel cell system 10 is completed, and it proceeds to an end. According to this, for example, as shown in FIG. 5, after the time t6 at which the command value H2PMP is set to zero, the number of drive revolutions of the hydrogen pump 28 decreases toward zero.

Figure 6:
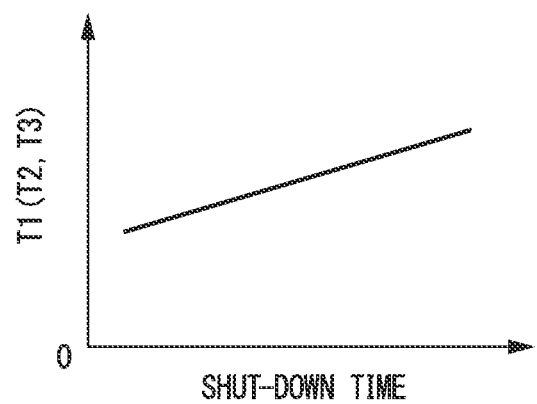
FIG. 6 is a diagram illustrating an example of a correlation between respective predetermined times T1, T2, and T3, and the shut-down time during starting of the fuel cell system according to the embodiment of the invention.

In addition, in each of "State 1", "State 2", and "State 3", for example, each of the predetermined times T1, T2, and T3 may be a value corresponding to the shut-down time TMSOAK as shown in FIG. 6. For example, as the shut-down time TMSOAK becomes longer, each of the predetermined times T1, T2, and T3 varies toward an increasing trend.

As described above, according to the method of starting the fuel cell system 10 according to the embodiment, in "State 1" in which the anode hydrogen-concentration is greater than or equal to the predetermined first threshold value M1, the opening of the purge valve 30 is prohibited, and thus it is possible to prevent the concentration of hydrogen discharged from the fuel gas discharge path 56 to the diluter 32 from being excessive. Furthermore, the hydrogen pressure of the anode 11A is set to be equal to the hydrogen pressure (predetermined pressure #PH2FCCHKN) during execution of the normal power generation, and thus execution of the normal power generation can be quickly initiated after completing the starting execution of the fuel cell system 10.

In addition, in "State 2" in which the anode hydrogen-concentration is greater than or equal to the predetermined second threshold value M2 and is less than the predetermined second threshold value M2, the hydrogen pressure of the anode 11A is further reduced compared to the predetermined pressure #PH2FCCHKN, and thus substitution with hydrogen in the anode 11A is promoted while suppressing an increase in the amount of hydrogen discharged from the fuel gas discharge path 56 to the diluter 32. As a result, it is possible to quickly start the fuel cell system 10.

In addition, in "State 3" in which the anode hydrogen-concentration is less than the predetermined second threshold value M2, the hydrogen pressure of the anode 11A is further increased compared to the predetermined pressure #PH2FCCHKN, and thus mixing-in by hydrogen on an anode supply port 11c side and an anode discharge port 11d side of the anode 11A is promoted. According to this, occurrence of a high potential state in a cathode potential is suppressed, and thus deterioration of the fuel cell stack 11 can be suppressed. Further, the number of drive revolutions of the hydrogen pump 28 is further increased compared to "State 1" and "State 2", the mixing-in by hydrogen on the anode supply port 11c side and the anode discharge port 11d side of the anode 11A can be further promoted. Further, when discharging retained water inside the system of the anode 11A, the number of drive revolutions of the hydrogen pump 28 is further decreased compared to a case of suppressing occurrence of the high potential state in the cathode potential. Accordingly, discharge of the retained water and water refilling in a catch tank (not shown) are promoted, and thus the fuel cell system 10 can be quickly started, and operation efficiency of the fuel cell system 10 can be improved.

Further, in "State 2" and "State 3", the purge valve 30 is opened, and thus substitution with hydrogen in the anode 11A can be promoted.

Further, the hydrogen pump 28 in the fuel gas circulation path 57 is driven, and thus the substitution with hydrogen in the anode 11A can be promoted.

Further, the hydrogen pump 28 is driven prior to initiation of the supply of hydrogen from the hydrogen tank 21 to the anode 11A, and thus a gas flow in a circulation system by the fuel gas circulation path 57, the fuel gas supply path 55, the anode 11A, and the fuel gas discharge path 56 can be formed in advance. According to this, when the supply of hydrogen from the hydrogen tank 21 to the anode 11A is initiated, substitution with hydrogen in the anode 11A can be promoted while suppressing occurrence of a nonuniform state in a hydrogen concentration distribution in a stack plane. Further, even after the power generation of the fuel cell stack 11 is initiated, the hydrogen pump 28 is continuously driven. Accordingly, for example, even in a case in which the supply of hydrogen from the injector 24 is stopped when the anode pressure decreases, and the like, occurrence of the nonuniform state in the hydrogen concentration distribution in the stack plane is suppressed, and thus it is possible to suppress a decrease in stoichiometry.

Further, as the shut-down time TMSOAK becomes longer, the drive time of the hydrogen pump 28, that is, each of the predetermined times T1, T2, and T3 is made to vary toward an increasing trend, and thus desired substitution with hydrogen in the anode 11A can be accurately carried out regardless of the shut-down time TMSOAK of the fuel cell.

Further, the anode hydrogen-concentration is assumed according to at least any of the shut-down time TMSOAK, the anode pressure Ph, and the cathode pressure Pa, and thus the concentration of hydrogen can be accurately acquired without providing a sensor that detects the concentration of hydrogen, and the like.

While preferred embodiments of the invention have been described and illustrated above, it should be understood that these are exemplary of the invention and are not to be considered as limiting.

What is claimed is:

1. A method of starting a fuel cell system comprising:
a fuel cell that generates electricity by a fuel of an anode and an oxidant of a cathode;
a fuel gas supply unit that supplies a fuel gas containing the fuel to the anode;
an oxidant gas supply unit that supplies an oxidant gas containing the oxidant to the cathode;
a connection and disconnection unit capable of completely switching connection and disconnection between the fuel cell and an electric load;
a hydrogen pump that circulates the hydrogen through a fuel gas circulation path;
a purge valve disposed on a fuel gas discharge path; and
a control unit that controls the fuel gas supply unit and the oxidant gas supply unit, the method comprising:
a hydrogen concentration acquisition process of acquiring a concentration of hydrogen as the fuel in the anode;
a threshold value determination process of determining whether or not the concentration of the hydrogen acquired by the hydrogen concentration acquisition process has reached a first threshold value, or a second threshold value, wherein the second threshold value is less than the first threshold value;
a starting pressure setting process of setting a pressure of the hydrogen that is supplied from the fuel gas supply unit during execution of starting of the fuel cell for supplying the hydrogen to the anode from the fuel gas supply unit in a state in which the connection and disconnection unit is shut off based on a determination result determined by the threshold value determination process; and
a hydrogen substitution process of substituting remaining hydrogen in the anode during shut-down of the fuel cell, with the hydrogen supplied from the fuel gas supply unit when the starting of the fuel cell is executed,
wherein in the starting pressure setting process, the method includes
defining a first state of the fuel cell system by setting the hydrogen pressure to be less than or equal to a pressure of the hydrogen during execution of normal power generation that is executed after the starting of the fuel cell is completed, and
defining a second state of the fuel cell system by setting the hydrogen pressure to be higher than the pressure of the hydrogen during execution of the normal power generation,
executing the first state of the fuel cell system when it is determined in the threshold value determination process that the concentration of the hydrogen is greater than or equal to the second threshold value,
executing the second state of the fuel cell system when it is determined in the threshold value determination process that the concentration of the hydrogen is less than the second threshold value,
the method further comprises a hydrogen pump drive process of driving the hydrogen pump during execution of starting of the fuel cell,
the hydrogen pump is continuously driven even after the power generation of the fuel cell stack is initiated,
the purge valve is closed after starting of the power generation of the fuel cell stack, and until the starting of the fuel cell is completed and the driving of the hydrogen pump is stopped,
in the hydrogen substitution process, the remaining hydrogen in the anode during shut-down of the fuel cell is substituted with the hydrogen supplied from the fuel gas supply unit at the pressure of the hydrogen set in the starting pressure setting process,
a start signal of the fuel cell system is received at a time t1,
the starting of the fuel cell is executed at a time t2,
the hydrogen pressure reaches a predetermined threshold value at a time t3, the execution of the normal power generation occurs at a time t4, and the purge valve is closed and the connection and disconnection unit is in a connected state at the time t4, and the hydrogen pressure remains constant during the execution of the first state or the second state between the time t3 and the time t4.

2. The method of starting a fuel cell system according to claim 1, wherein the fuel cell system further comprises:

a fuel gas discharge path from which the fuel gas discharged from the anode is allowed to flow; and a purge valve capable of opening and closing the fuel gas discharge path, the method further comprises:

a predetermined pressure determination process of determining whether or not the pressure of the hydrogen supplied from the fuel gas supply unit during the starting of the fuel cell is greater than or equal to a predetermined pressure corresponding to the concentration of the hydrogen which is acquired by the hydrogen concentration acquisition process; and a purge valve opening and closing process of closing the purge valve in a case where it is determined in the predetermined pressure determination process that the pressure of the hydrogen is less than the predetermined pressure, and of opening the purge valve in a case where it is determined in the predetermined pressure determination process that the pressure of the hydrogen is greater than or equal to the predetermined pressure.

3. The method of starting a fuel cell system according to claim 2, wherein in the threshold value determination process, it is determined whether or not the concentration of the hydrogen which is acquired by the hydrogen concentration acquisition process is greater than or equal to a second threshold value larger than the first threshold value, and in a case where it is determined in the threshold value determination process that the concentration of the hydrogen is greater than or equal to the second threshold value, in the starting pressure setting process, the hydrogen pressure is set to be equal to the pressure of the hydrogen during execution of the normal power generation, and the method further comprises:

a purge valve opening prohibiting process of prohibiting the opening of the purge valve in a case where it is determined in the threshold value determination process that the concentration of the hydrogen is greater than or equal to the second threshold value.

4. The method of starting a fuel cell system according to claim 1, wherein the fuel cell system further comprises:

a fuel gas supply path through which the fuel gas is allowed to flow to be supplied to the anode; and a fuel gas discharge path through which the fuel gas discharged from the anode is allowed to flow, wherein the fuel gas circulation path connects the fuel gas discharge path and the fuel gas supply path and through which the fuel gas discharged from the anode is allowed to flow to the fuel gas supply path.

5. The method of starting a fuel cell system according to claim 1, wherein in a case where it is determined in the threshold value determination process that the concentration of the hydrogen is less than the second threshold value, in the hydrogen pump drive process, the number of drive revolutions of the hydrogen pump is further increased compared with a case where it is determined in the threshold value determination process that the concentration of the hydrogen is greater than or equal to the second threshold value.

6. The method of starting a fuel cell system according to 1, wherein in the hydrogen pump drive process, the hydrogen pump is driven prior to the supply of the hydrogen from the fuel gas supply unit to the anode.

7. The method of starting a fuel cell system according to claim 1, wherein in the hydrogen pump drive process, a drive time of the hydrogen pump is changed into an increasing trend along with an increase in a shut-down time of the fuel cell.

8. The method of starting a fuel cell system according to claim 5, wherein in the hydrogen pump drive process, the number of drive revolutions of the hydrogen pump is decreased after a predetermined time elapses after increasing the number of drive revolutions of the hydrogen pump.

9. The method of starting a fuel cell system according to claim 1, wherein in the hydrogen concentration acquisition process, the concentration of the hydrogen is estimated using at least any one of the shut-down time of the fuel cell, an atmospheric pressure of the anode for a shut-down term of the fuel cell, and an atmospheric pressure of the cathode for the shut-down term of the fuel cell.

* * * * *